358-190. OR 3,740,474 SR

United States Patent [19]

Dietz

[11] 3,740,474

[45] June 19, 1973

[54] VOLTAGE SUPPLIES

[75] Inventor: Wolfgang Friedrich Wilhelm Dietz, New Hope, Pa.

[73] Assignee: RCA Corporation, New York, N.Y.

[22] Filed: Nov. 1, 1971

[21] Appl. No.: 194,389

[52] U.S. Cl. ...................... 178/7.5 R, 178/DIG. 11

[51] Int. Cl. ...................... H04n 5/44

[58] Field of Search ...................... 178/7.3 R, 7.5 R, 178/DIG. 11; 315/27 TD

[56] References Cited

UNITED STATES PATENTS 3,517,253 6/1970 Dietz ...................... 315/27 R

*Primary Examiner*—Robert L. Griffin
*Assistant Examiner*—George G. Stellar
*Attorney*—Eugene M. Whitacre

[57] ABSTRACT

Direct operating voltages for a television receiver are derived from an associated line scanning circuit of the type employing semiconductor (e.g., SCR) trace and commutating switches, each of which conducts for a portion of each line scanning interval. One voltage supply is derived by means of a full wave rectifier circuit coupled to an input inductance, the inductance being coupled from a main direct operating voltage source to a circuit point intermediate the trace and commutating switches. Additional direct voltages are derived by rectifying flyback pulses produced across various segments of an associated scanning output transformer. At least one of the flyback pulse rectifying circuits includes an arrangement of inductance and capacitance coupled to the associated rectifier for constraining conduction of the rectifier mainly to the first half of the flyback pulse.

The derived voltages are relatively insensitive to changes in beam current and line voltage and, furthermore, do not deleteriously affect operation of the scanning circuit.

11 Claims, 3 Drawing Figures

T 5117

Rv

VOLTAGE SUPPLIES

The present invention relates to voltage supplies and, in particular, to improved voltage supplies which are derived from the line scanning or deflection circuits of a television receiver.

A number of different techniques are currently employed for providing the various operating voltage levels that are required in television receivers. It is customary in large screen receivers to employ a supply line transformer and associated rectifiers and filters to provide most of the desired operating voltages. Additional high voltages, such as are associated with the image-reproducing device (e.g., a three gun kinescope employing a shadow mask), are derived by rectifying flyback pulses produced in the receiver line scanning circuits during the retrace portions of each scanning cycle.

Much effort has been expended in the past to design receivers which do not require the use of the relatively bulky and expensive line transformer. Some approaches which achieve this objective involve operation of a major portion of the receiver, including the line deflection circuits directly from a power line rectifier circuit without the use of a transformer. Typically, this approach provides a B+ voltage of either 150 volts (where the a.c. supply line voltage is 120 volts) or of 300 volts (where the a.c. supply line voltage is 240 volts). Additional higher and lower voltages then may be derived from rectifiers associated with various taps on the flyback transformer in the line scanning circuit. However, a point of diminishing return is reached in such arrangements when the auxiliary power taken from the flyback transformer becomes relatively great. In such a case, the primary function of the flyback transformer as the source of deflection current and high voltage is adversely affected.

In accordance with the present invention, voltage supply arrangements for a television receiver are associated with the line scanning circuits of the receiver. A rectifier arrangement is adapted for direct connection to an alternating current supply line and provides a primary, direct operating voltage (B+) for the line scanning circuit. The line scanning circuit comprises trace and commutating switching means interconnected by reactive energy storage components. The primary operating voltage is coupled via a first inductance to the commutating switching means and to the energy storage components. A first auxiliary voltage supply is provided by a full wave rectifier-filter arrangement inductively coupled to the first inductance.

The line scanning circuit further comprises a flyback transformer coupled to the trace switching means. The flyback transformer includes a step-up winding for coupling high voltage pulses to an ultor voltage rectifier-filter arrangement. Additional pulse output terminals also may be provided on the flyback transformer for providing different pulse voltage levels for rectification.

In accordance with a further aspect of the invention, pulses are supplied at one of the pulse output terminals to the combination of a rectifier, a filter capacitor coupled to the rectifier and an inductor coupled between the filter capacitor and a load circuit. The filter capacitor and inductor are selected to restrict conduction of the associated rectifier mainly to the first half of the scanning retrace interval.

Other aspects of the present invention will be readily apparent upon a reading of the following detailed description in conjunction with the accompanying drawing, in which.

Figures 1, 2:
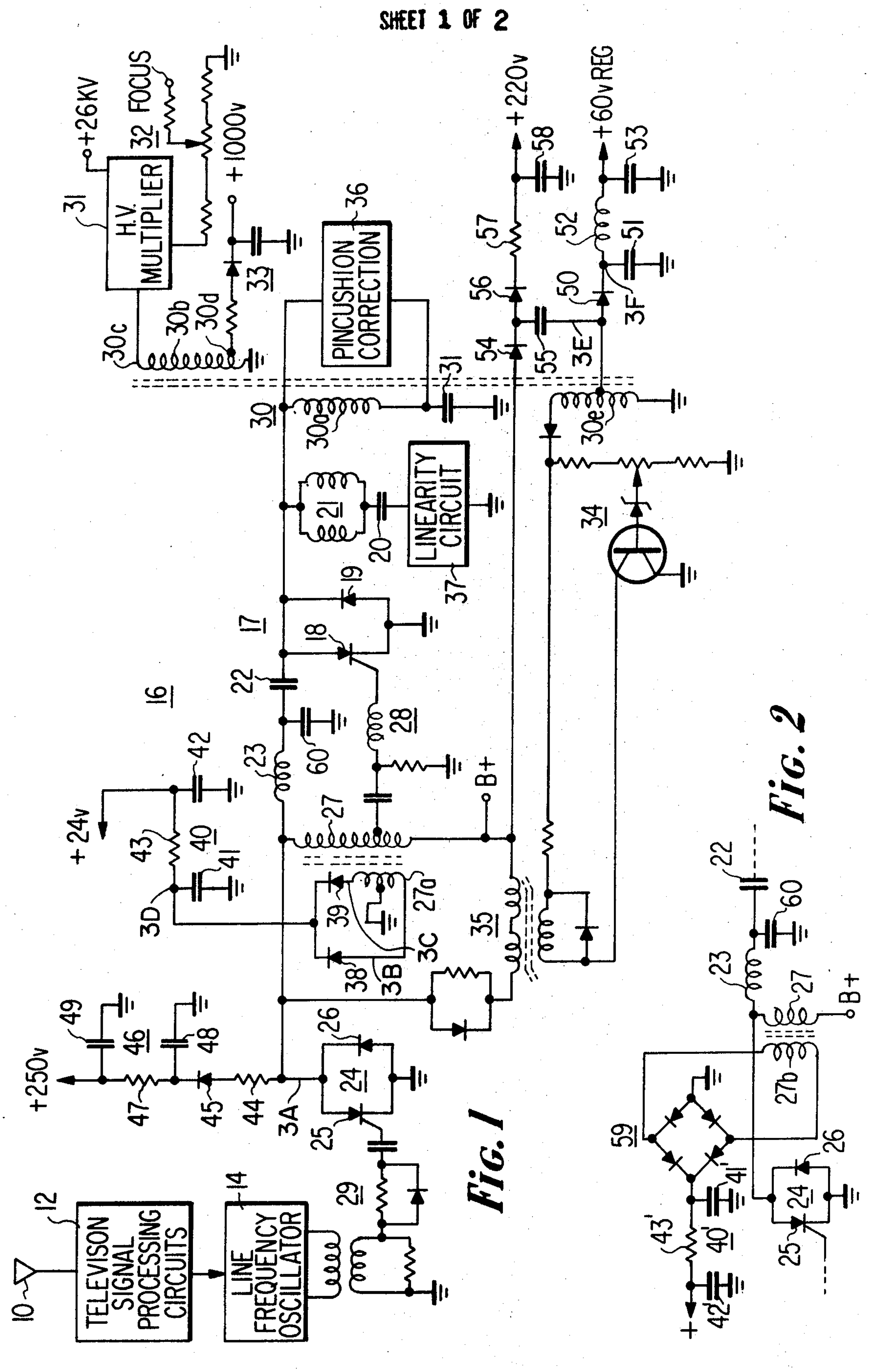
FIG. 1 is a diagram, partially in block form and partially in schematic circuit form, of a portion of a color television receiver, the circuitry including line scanning components and associated voltage supplies constructed in accordance with the present invention.
FIG. 2 is a schematic diagram of a portion of the line scanning circuit of FIG. 1 including a modified version of a portion of the associated voltage supplies.

Referring to FIG. 1, the bulk of the television receiver may be of known form such as, for example the CTC-49 Series receiver shown in RCA Television Service Data 1970 No. T19, published by RCA Sales Corporation, Indianapolis, Ind.

In such a receiver, a carrier wave modulated by composite color television signals is coupled via an antenna 10 to television signal processing circuits 12 which include the customary R.F. tuner, frequency converter, I.F. amplifier and video detector. Video signals are recovered in the signal processing circuits 12 and are amplified in a video amplifier. The amplified video signals are supplied to a keyed AGC circuit which controls gain in the R.F. and I.F. amplifiers in accordance with known principles. The recovered video signals also are applied to a chrominance channel, a luminance channel and a synchronizing signal separator. The chrominance channel processes the color information to a form suitable for application to a color image reproducer. A three-gun shadow mask color kinescope serves as the color image reproducer in the CTC-49 receiver referred to above. The electrode structure of such a kinescope includes respective red, green and blue cathodes; red, green and blue control grids; red, green and blue screen electrodes; a focusing electrode structure and an ultor electrode (or final anode).

A deflection yoke is associated with the color kinescope and responds to field (vertical) and line (horizontal) deflection waves to cause individual electron beams produced by the kinescope to trace a raster on the included phosphor screen. A convergence assembly which responds to suitable dynamic convergence waveforms to cause the electron beams to properly converge is also customarily associated with the kinescope.

The chrominance and luminance signal channels are appropriately interconnected with the kinescope electrodes so as to reproduce the desired color image.

Outputs from the sync separator are applied to vertical deflection circuits and to a horizontal or line frequency oscillator 14. The line frequency oscillator 14, which may be a known blocking oscillator configuration, develops a periodic switching voltage under the control of line synchronizing pulses derived from the sync separator apparatus. The oscillator 14 is associated with suitable deflection AFC apparatus (not shown) for assuring the desired synchronization.

The periodic switching voltage developed by oscillator 14 is applied to a line deflection circuit indicated generally by the reference numeral 16.

Deflection circuit 16 is of the type shown and described in my U.S. Pat. No. 3,452,244, granted June 24, 1969, entitled "Electron Beam Deflection And High Voltage Generation Circuit," which is assigned to the same assignee as the present invention. Deflection circuit 16 comprises a bidirectionally conductive trace switching means 17, having a silicon controlled rectifier (SCR) 18 and a diode 19, for coupling a relatively large energy storage capacitor 20 across a line deflection winding 21 during the trace portion of each line deflection cycle. A first capacitor 22 and a commutating inductor 23 are coupled from trace switching means 17 to a bidirectionally conductive commutating switching means 24, the latter comprising an SCR 25 and a diode 26. A second capacitor 60 is coupled from the junction of capacitor 22 and inductor 23 to ground. A main or B+ voltage supply of, for example, 150 volts is coupled to a relatively large supply inductor 27, which, in turn, is coupled to the junction of commutating inductor 23 and commutating switching means 24. Such a B+ voltage supply typically is derived by direct connection of a fullwave rectifier-filter arrangement to the 120 volt a.c. line voltage source.

A triggering circuit 28 is coupled from a tap on inductor 27 to a gate electrode of SCR 18 to initiate conduction in SCR 18 during the trace portion of each deflection cycle. A further triggering circuit 29 is coupled from oscillator 14 to a gate electrode of commutating SCR 25 to initiate conduction in SCR 25 near the end of the trace portion of each deflection cycle.

The primary winding **30*a* of a line deflection output (flyback) transformer 30 is coupled to deflection winding 21 and is returned to a.c. ground by means of a capacitor 31. A secondary step-up winding 30*b*, having a high voltage terminal 30*c* and a screen voltage terminal 30*d*, is magnetically coupled to winding 30*a* and is returned to the reference or ground potential at its lower end. High voltage (e.g., 26,000 volts) may be derived from secondary winding 30*b* by, for example, coupling a commercially available multiplier arrangement 31 of diodes and capacitors between terminal 30*c* and the ultor electrode of the associated kinescope. A voltage appropriate for application to the focus electrode of the kinescope may be derived across an adjustable resistive voltage divider arrangement 32 coupled between the focus voltage terminal of multiplier 31** and ground.

A screen voltage supply may also be derived from the winding 30b by coupling an appropriate rectifier, resistor, filter capacitor arrangement 33 to screen supply terminal 30d.

Deflection circuit 16 further comprises regulating means 34 coupled to input inductor 27 for varying the input power supplied to deflection circuit 16. Typically, the regulating means 34 is arranged with respect to the remainder of deflection circuit 16 so as to maintain image width substantially constant over the expected operating range of supply voltage (B+) and kinescope beam current variations. The general principles of the regulating means 34 are described in my U.S. Pat. No. 3,517,253, granted June 23, 1970, entitled "Voltage Regulator," which is assigned to the same assignee as the present invention.

For purposes of the present invention, it is sufficient to note that regulating means 34 includes a further winding 30e inductively coupled to the windings **30*a* and 30*b* of transformer 30 for coupling flyback pulses to control elements of regulating means 34. The control elements include a saturable reactor 35 coupled across input inductor 27**.

Additional circuitry such as convergence elements (not shown), pincushion correction circuitry 36 and linearity correction circuitry 37 may also be included in deflection circuit 16 as required. One type of linearity correction circuit which is particularly suitable for use in the illustrated manner is described in my copending U.S. Pat. Application Ser. No. 006,122, filed Jan. 27, 1970, entitled "Linearity Correction Circuitry Utilizing A Saturable Reactor," which is assigned to the same assignee as the present invention. A suitable pincushion correction circuit is described in my copending U.S. Pat. Application Ser. No. 43,767, filed June 5, 1970, entitled "Raster Correction Circuit," which is also assigned to the same assignee as the present invention.

In the operation of the television receiver, each of the amplifiers of the signal processing circuits 12, as well as electrodes of the above-described kinescope arrangement, require operating voltage. Actually, a plurality of different operating voltage levels are required such as 24 volts for transistor signal processing circuits, 60 to 70 volts for vertical deflection output elements, two hundred fifty volts for video output circuits, 1,000 volts for the kinescope screen electrode, and 26,000 volts for the kinescope ultor electrode.

In accordance with the present invention, the required operating voltages for the remainder of the receiver are derived from deflection circuit 16 without deleterious effect on the deflection characteristics of circuit 16. To this end, a center-tapped step-down winding **27*a* is inductively coupled to input inductor 27, for example, by placing winding 27*a* on a common core of magnetic material with input inductor 27. The center tap of winding 27*a* is connected to ground while the ends of winding 27*a* are connected to respective anodes of rectifiers 38 and 39. Cathode electrodes of rectifiers 38 and 39 are joined together and are also coupled to a filter network 40 comprising first and second capacitors 41, 42 and a series resistor 43. Capacitors 41 and 42 are returned to ground. A further voltage supply comprising a resistor 44, a rectifier 45 and a filter network 46, the latter comprising resistor 47 and capacitors 48 and 49, is connected between commutating switching means 24** and ground.

A regulated, relatively low voltage supply (e.g., 60 volts) is derived from winding **30*e* of transformer 30 by means of a rectifier 50, a first capacitor 51, an inductor 52 and a second capacitor 53**.

Additional supply voltages may also be derived, for example, by a voltage "doubling" arrangement comprising a rectifier 54 coupled to the B+ terminal, a capacitor 55 coupled between winding **30*e* and rectifier 54, a rectifier 56 coupled from the junction of rectifier 54 and capacitor 55 to an output terminal by means of a resistor 57 and a filter capacitor 58**.

The detailed operation of the deflection circuit 16 and voltage regulator arrangement 34 are set forth in my above-referenced prior patent and application but will be restated briefly below to aid in understanding the present invention.

At the beginning of the trace portion of each line deflection cycle, diode 19 is forward biased and couples deflection winding 21 across a relatively constant voltage supplied by capacitor 20. Current in winding 21 declines in an approximately linear manner from a maximum value of one polarity towards zero during the first half of trace. Prior to the midpoint of the trace portion of the deflection cycle, SCR 18 is conditioned for conduction by means of a gating signal provided by triggering circuit 28. Approximately midway through trace, the current in deflection winding 21 reverses and switches from diode 19 to SCR 18. Diode 19 is then reverse biased and deflection current flows from capacitor 20 through SCR 18. The current in winding 21 continues to increase in an approximately linear fashion for the remainder of the trace interval. Near the end of each trace interval, the commutating switching means 24 is triggered into conduction by pulses supplied by oscillator 14. Energy previously stored in capacitors 22 and 60 (as will be explained below) is then circulated through retrace switching means 24 and trace switching means 17 so as to reverse the current flow through switching means 17 twice in a few microseconds time and thereby successively open SCR 18 and diode 19. Retrace then begins. The circulating energy associated with capacitors 22 and 60 is then exchanged, via commutating switching means 24, with deflection winding 21 and the voltage supply circuitry coupled to horizontal output transformer 30. Relatively short duration (e.g., 11.5 microsecond), high amplitude flyback voltage pulses are produced across the several windings of transformer 30 and are rectified, for example, by high voltage multiplier 31 and the rectifier in screen supply 33 to produce positive operating voltages for the associated kinescope.

In addition, pulses produced across winding **30*e* are coupled to regulating circuit 34 for comparison with a preselected reference value. Variations from the reference value are coupled to saturable reactor 35 so as to vary the effective inductance between the B+ terminal and the junction of capacitors 22 and 60. Variations in the effective input inductance of the circuit varies the energy supplied to capacitors 22 and 60 and thereby controls the energy available for subsequent transfer to deflection winding 21 and the voltage supplies associated with transformer 30. The desired operating conditions (e.g., image width, high voltage, etc.) are thereby controlled in deflection circuit 16.**

Figure 3:
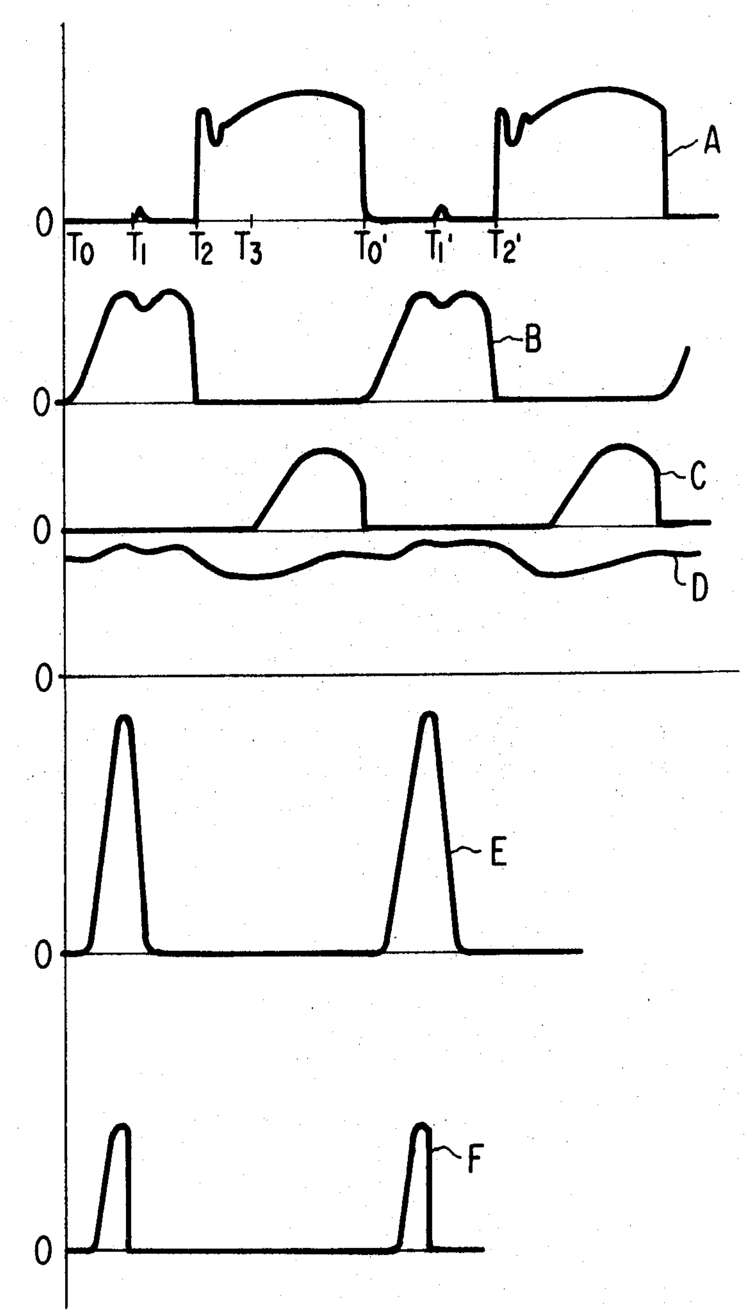
FIG. 3 is a series of voltage and current waveform diagrams which illustrate the operation of the circuit of FIG. 1.

The manner in which the voltage supplies associated with inductor 27 operate will now be described by referring to the waveform diagrams of FIG. 3.

As noted above, the trace switching means 17 is maintained conductive throughout the trace interval and non-conductive throughout the retrace interval of each line deflection cycle. Typical values of these intervals, for example, in a 525 line, 60 field per second system, are 52 microseconds and 11.5 microseconds, respectively. The commutating switching means 24, on the other hand, conducts during an interval which commences at $T_0$ (FIG. 3), a time shortly (e.g., 3–5 microseconds) before the end of trace and ends at $T_2$ approximately midway through the first half of the trace interval. The interval $T_0$ to $T_2$ typically is of the order of 28 microseconds. The commutating switching means 24 may open briefly in this interval as is shown by the momentary increase of the voltage across switching means 24 at time $T_1$ (FIG. 3—waveform A). During the interval $T_0$ to $T_2$, when switching means 24 is conductive, substantially the full B+ voltage (e.g., +150 volts) is coupled across input inductor 27. Current in inductor 27 increases during this time (with the exception of a decrease in the vicinity of time $T_1$ when switching means 24 is open). As the energy stored in inductor 27 increases, a portion of such energy is coupled to winding **27*a* causing conduction in one of the diodes 38, 39 (e.g., diode 38) as is shown by the current waveform B in FIG. 3. At this time, the other diode (e.g., 39) is cut off (see current waveform C). The voltage across capacitor 41 (waveform D) varies in response to the charging current supplied via diodes 38, 39. Prior to the time $T_2$, the retrace interval of the deflection cycle ends and trace switching means 17 closes. This does not have an immediate effect on commutating switching means 24 but, as is explained in my above-referenced patent, at the later time $T_2$, current and voltage conditions in the circuit are such that switching means 24 opens. The voltage across switching means 24 rapidly increases at time $T_2$ and current in diode 38 declines rapidly to zero. At this time, energy is transferred from inductor 27 to capacitors 22 and 60 and the voltage across switching means 24 varies accordingly (waveform A). The resulting peak voltage produced across switching means 24 is approximately twice B+. At time $T_3$, the voltage across switching means 24 has risen sufficiently above the B+ level to cause diode 39 to be forward biased and current flows in diode 39 (waveform C) to further charge capacitor 41. Conduction of diode 39 ceases when commutating switching means 24 is again switched on at time $T_0'$. Energy is supplied from the filter circuit 40 to an associated load in signal processing circuits 12. The voltage across capacitor 41 (waveform D) therefore declines slightly during the interval between conduction of diodes 38 and 39.**

The additional load of the winding **27*a* and associated components across input inductor 27 has been observed as having substantially no adverse effect on the operation of the remainder of deflection circuit 16. It has also been observed that the current supplied to capacitor 41 during the interval $T_0$ to $T_2$ (e.g., via diode 38) varies inversely with variations in beam current in the associated kinescope. However, the current supplied to capacitor 41 during the interval $T_2$ to $T_0'$ varies directly with such changes in beam current. The effect of variations in beam current on the voltage provided across capacitor 42 is therefore diminished. The particular voltage level developed across capacitor 42 may be selected by choosing the turns ratio of inductors 27 and 27*a*** in an appropriate manner. As illustrated, an output voltage level of 24 volts may be produced, which voltage is particularly suitable for operation of transistorized signal processing circuit in the remainder of the receiver.

The voltage supply arrangement comprising the circuit elements 44–49 is arranged as a half wave rectifier of the voltage across switching means 24 (i.e., waveform A). As noted above, the peak value of that voltage approaches twice B+ and therefore a supply voltage of 250 volts readily may be produced. That voltage is particularly suitable for application to video output stages of the receiver.

Alternatively, the video output stages may be supplied by means of the arrangement of circuit elements 54–58. In that arrangement, flyback pulses of the order of 100 volts peak amplitude are coupled from winding **30*e* to one end of capacitor 55. The opposite end of capacitor 55 is coupled via rectifier 54 to the B+ terminal. Therefore, a direct voltage approximately equal to B+ is maintained across capacitor 55. The sum of the flyback pulse and B+ is applied by rectifier 56 to capacitor 58** to produce a desired direct voltage of, for example, 220 volts.

The flyback voltage pulses produced across winding 30*e* (waveform E, FIG. 3) are also supplied to rectifier 50. The pulse voltage increases rapidly and when it exceeds the voltage across capacitor 51, rectifier 50 conducts (current waveform F) to store charge in capacitor 51. The charge stored in capacitor 51 subsequently is transferred via inductor 52 to capacitor 53 which, in turn, is coupled to the appropriate load circuit. Inductor 52 is chosen to resonate with capacitor 51 at a frequency approximately one-half the line scanning frequency (e.g., the latter being 15,734 Hertz). The voltage across capacitor 51 therefore varies in a cosine manner from a maximum value at the end of conduction of rectifier 50 (e.g., near the middle of retrace) to a value approaching zero at the beginning of the next retrace interval. As a result, rectifier 50 begins conduction very shortly (between one and two microseconds) after the flyback pulse begins to increase. Representative values which may be employed for capacitor 51 and inductor 52 to achieve this result are 0.25 microfarads and 1.8 millihenries, respectively.

The duration of conduction of rectifier 50 is determined essentially by the capacitance of capacitor 51 and the leakage inductance of the associated portion of transformer winding 30*e*. The conduction duration is approximately one-half the resonant period of such components. It has been found that, in the illustrated type of circuit, it is advantageous to confine conduction of rectifier 50 mainly to the first half of the retrace interval. In this manner, the effect of voltage supply 50, 51, 52, 53 on the operation of the regulator system 34 is minimized. That is, in the illustrated system, extraction of energy during the first half of flyback or retrace has substantially no effect on either image width or ultor voltage. This desired result follows from the fact that energy transfer from capacitors 22 and 60 to restore losses in the ultor voltage supply circuit and the deflection winding circuit takes place during the second half of retrace. It should also be noted that the magnitude of the voltage produced across capacitor 53 does not vary significantly as a function of beam current or high voltage in the associated kinescope. The voltage across capacitor 53 therefore may be considered to be a "regulated" voltage and is suitable for application to a vertical deflection output stage such as is shown in the above-referenced CTC–49 Service Data.

Various modifications may be made in the arrangement of FIG. 1 without departing from the present invention. For example, as is illustrated in FIG. 2, where like reference numerals are used for components which correspond to those shown in FIG. 1, the rectifier arrangement 38, 39 may be replaced by a four diode bridge rectifier arrangement 59. One diagonal of the bridge 59 is coupled across winding 27*b* while the other diagonal of bridge 59 is connected between ground and the filter elements 40′. The duration of conduction and wave shape of currents in the bridge 59 is generally similar to that obtained in the circuit of FIG. 1. As in the FIG. 1 arrangement, conduction through bridge 59 occurs during both the on and off intervals of commutating switching means 24, providing the desired result of lowered sensitivity of the rectified output voltage to changes in beam current.

Resistors may be added in series with each of rectifiers 38, 39 or a single resistor may be added between the joined cathodes of rectifiers 38, 39 and the filter capacitor 41. Some variations in the illustrated waveforms will be obtained in that case.

Other modifications may also be made to the illustrated circuit within the scope of the invention as would be apparent to persons having knowledge of television receiver design.

What is claimed is:

1. In a television receiver, a voltage supply system comprising a line scanning circuit having at least first and second controllable switching means arranged for conduction during respective first and second portions of each line scanning cycle, reactive circuit means, including energy storage capacitance, coupled between said first and second switching means, primary voltage supply means for providing a primary direct operating voltage, inductive means coupled between said primary voltage supply means and said reactive circuit means for coupling energy to said capacitance, and auxiliary voltage supply means comprising full-wave rectifying means and a filter circuit coupled to said inductive means for providing an auxiliary direct operating voltage.

2. A voltage supply system according to claim 1 and further comprising regulating means including a variable inductance coupled to said inductive means and responsive to changes in operating conditions in said line scanning circuit for varying said inductance to counteract said changes.

3. A voltage supply system according to claim 1 wherein said inductive means comprises a first winding, and said auxiliary voltage supply means comprises a secondary winding associated with said first winding and a bridge rectifier arrangement coupled between opposite ends of said secondary winding and said filter circuit.

4. A voltage supply system according to claim 3 and further comprising regulating means including a variable inductance coupled to said inductive means and responsive to changes in operating conditions in said line scanning circuit for varying said inductance to counteract said changes.

5. A voltage supply system according to claim 1 wherein said inductive means comprises a first winding, and said auxiliary voltage supply means comprises a center-tapped secondary winding associated with said first winding and first and second rectifiers coupled to opposite ends of said secondary winding and to said filter circuit.

6. A voltage supply system according to claim 5 and further comprising regulating means including a variable inductance coupled to said inductive means and responsive to changes in operating conditions in said line scanning circuit for varying said inductance to counteract said changes.

7. A voltage supply system according to claim 6 and further comprising additional rectifying and filtering means direct coupled to said second switching means and to said inductive means for providing a further direct operating voltage supply.

8. A voltage supply system according to claim 6 and further comprising a transformer coupled across said first switching means, additional rectifying means coupled to a point on said transformer and poled to respond to voltage pulses produced at said point during the retrace portion of each line scanning cycle, and filtering means coupled to said additional rectifying means comprising a first capacitor and a first inductor, said inductor and capacitor being resonant at a frequency such that said additional rectifying means conducts mainly during the first half of said retrace portion.

9. In a television receiver, a voltage supply system comprising a line scanning circuit having at least first and second controllable switching means arranged for conduction during respective first and second portions of each line scanning cycle, reactive circuit means, including energy storage capacitance, coupled between said first and second switching means, means for supplying a primary direct operating voltage, inductive means coupled between said voltage supplying means and said reactive circuit means for coupling energy to said capacitance, a transformer having leakage inductance associated therewith coupled across said first switching means, rectifying means coupled to a terminal on said transformer and poled to respond to voltage pulses produced at said terminal during the retrace portion of each line scanning cycle, and filtering means coupled to said rectifying means comprising a first capacitor and a first inductor, said inductor and capacitor being resonant at a frequency such that said rectifying means conducts mainly during the first half of said retrace portion.

10. In a television receiver, a voltage supply system according to claim 9 wherein:

said first capacitor and leakage inductance associated with said terminal on said transformer being proportioned to facilitate conduction of said additional rectifying means during said first half of said retrace portion.

11. In a television receiver, a voltage supply system according to claim 9 and further comprising regulating means including a variable inductance coupled to said inductive means and responsive to changes in operating conditions in said line scanning circuit for varying said inductance to counteract said changes, and a second capacitor coupled to said first inductor remote from said first capacitor for providing a regulated auxiliary voltage.

* * * * *